United States Patent
Zhang et al.

(10) Patent No.: US 11,323,316 B2
(45) Date of Patent: May 3, 2022

(54) DEVICE CONFIGURATION METHOD AND APPARATUS THAT ARE BASED ON NETWORK CONFIGURATION PROTOCOL

(71) Applicant: Huawei Technologies Co., Ltd., Shenzhen (CN)

(72) Inventors: Lin Zhang, Shenzhen (CN); Jishang Yang, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 141 days.

(21) Appl. No.: 16/160,358

(22) Filed: Oct. 15, 2018

(65) Prior Publication Data
US 2019/0052526 A1  Feb. 14, 2019

Related U.S. Application Data

(63) Continuation of application No. PCT/CN2017/079558, filed on Apr. 6, 2017.

(30) Foreign Application Priority Data

Apr. 15, 2016 (CN) .......................... 201610234776.9

(51) Int. Cl.
*H04L 41/0803* (2022.01)
*H04L 41/0213* (2022.01)
(Continued)

(52) U.S. Cl.
CPC ........ *H04L 41/0803* (2013.01); *H04L 41/024* (2013.01); *H04L 41/0213* (2013.01);
(Continued)

(58) Field of Classification Search
CPC ............ H04L 41/0803; H04L 41/0213; H04L 41/024; H04L 41/08; H04L 41/0853; H04L 41/0893; G06F 16/22
(Continued)

(56) References Cited

U.S. PATENT DOCUMENTS 8,830,823 B2 * 9/2014 Koponen ............ H04L 41/0853
                                                  370/219
9,083,609 B2 * 7/2015 Casado ............... H04L 41/0859
(Continued)

FOREIGN PATENT DOCUMENTS

CN  102223291 A  10/2011
CN  103281197 A   9/2013
(Continued)

OTHER PUBLICATIONS

Jurgen Schonwalder, Network Configuration Management Using NETCONF and YANG, 2010, IEEE, at least p. 168 (Year: 2010).*
(Continued)

*Primary Examiner* — Joseph L Greene
(74) *Attorney, Agent, or Firm* — Rimon PC

(57) ABSTRACT

A device configuration method, apparatus, and system based on Network Configuration Protocol (NETCONF), and belong to the field of communications technologies. The method includes establishing, by a network management device, a model of configuration data using a predefined Yet Another Next Generation (YANG) model, and sending the configuration data to a managed device based on NETCONF. The predefined YANG model includes n reference fields and one or more object fields separately corresponding to each reference field. Hence, resolves problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex.

18 Claims, 6 Drawing Sheets

(51) Int. Cl.
*H04L 41/08* (2022.01)
*H04L 41/0853* (2022.01)
*H04L 41/0893* (2022.01)
*H04L 41/02* (2022.01)
*G06F 16/22* (2019.01)

(52) U.S. Cl.
CPC .......... *H04L 41/08* (2013.01); *H04L 41/0853* (2013.01); *H04L 41/0893* (2013.01); *G06F 16/22* (2019.01)

(58) Field of Classification Search
USPC ....................................................... 709/220
See application file for complete search history.

(56) References Cited

U.S. PATENT DOCUMENTS

| | | | |
|---|---|---|---|
| 2012/0110028 A1* | 5/2012 | Athreya | G06F 16/214 707/803 |
| 2015/0019991 A1* | 1/2015 | Kristjansson | H04L 41/0853 715/747 |
| 2016/0294611 A1* | 10/2016 | Khambatkone | H04L 41/0803 |
| 2016/0373300 A1 | 12/2016 | Liu | |
| 2017/0078158 A1* | 3/2017 | Dec | G06F 11/30 |

FOREIGN PATENT DOCUMENTS

| | | |
|---|---|---|
| CN | 103701653 A | 4/2014 |
| CN | 104065514 A | 9/2014 |
| CN | 104243198 A | 12/2014 |
| CN | 104883266 A | 9/2015 |

OTHER PUBLICATIONS

Machine Translation and Abstract of Chinese Publication No. CN102223291, dated Oct. 19, 2011, 21 pages.
Machine Translation and Abstract of Chinese Publication No. CN103281197, dated Sep. 4, 2013, 14 pages.
Machine Translation and Abstract of Chinese Publication No. CN103701653, dated Apr. 2, 2014, 22 pages.
Machine Translation and Abstract of Chinese Publication No. CN104065514, dated Sep. 24, 2014, 11 pages.
Machine Translation and Abstract of Chinese Publication No. CN104243198, dated Dec. 24, 2014, 15 pages.
Xu, H., et al., "Data Modeling for NETCONF-Based Network Management: XML Schema or YANG," 11th IEEE International Conference on Communication Technology, Dec. 16, 2008, 4 pages.
Yanan, C., "Research and Implementation of YANG-based NETCONF Data Modeling," Huazhong Normal University, Computer Application Technology, 2009, 2 pages.
Enns, R., Ed., "NETCONF Configuration Protocol," RFC 4741, Dec. 2006, 95 pages.
Wasserman, M., et al, "Using the NETCONF Configuration Protocol over Secure SHell (SSH)," RFC 4742, Dec. 2006, 10 pages.
Goddard, T., "Using NETCONF over the Simple Object Access Protocol (SOAP)," RFC 4743, Dec. 2006, 20 pages.
Lear, E., et al, "Using the NETCONF Protocol over the Blocks Extensible Exchange Protocol (BEEP)," RFC 4744, Dec. 2006, 10 pages.
Bjorklund, M., Ed., "YANG—A Data Modeling Language for the Network Configuration Protocol (NETCONF)," RFC 6020, Oct. 2010, 173 pages.
Enns, R., Ed., et al, "Network Configuration Protocol (NETCONF)," RFC 6241, Jun. 2011, 113 pages.
Wasserman, M., "Using the NETCONF Protocol over Secure Shell (SSH)," RFC 6242, Jun. 2011, 11 pages.
Bierman, A., et al. "With-defaults Capability for NETCONF," RFC 6243, Jun. 2011, 26 pages.
Shafer, P., "An Architecture for Network Management Using NETCONF and YANG," RFC 6244, Jun. 2011, 30 pages.
Foreign Communication From a Counterpart Application, PCT Application No. PCT/CN2017/079558, English Translation of International Search Report dated May 24, 2017, 3 pages.
Foreign Communication From a Counterpart Application, PCT Application No. PCT/CN2017/079558, English Translation of Written Opinion dated May 24, 2017, 3 pages.
Foreign Communication From a Counterpart Application, European Application No. 17781832.5, Extended European Search Report dated Jan. 29, 2019, 8 pages.

* cited by examiner

DEVICE CONFIGURATION METHOD AND APPARATUS THAT ARE BASED ON NETWORK CONFIGURATION PROTOCOL

CROSS-REFERENCE TO RELATED APPLICATIONS

This application is a continuation of International Patent Application No. PCT/CN2017/079558 filed on Apr. 6, 2017, which claims priority to Chinese Patent Application No. 201610234776.9 filed on Apr. 15, 2016. The disclosures of the aforementioned applications are hereby incorporated by reference in their entireties.

TECHNICAL FIELD

This application relates to the field of communications technologies, and in particular, to a device configuration method and apparatus that are based on Network Configuration Protocol (NETCONF).

BACKGROUND

A NETCONF is a network management protocol that is based on Extensible Markup Language (XML). NETCONF uses a four-layer architecture, including a Secure Transport layer, a Messages layer, an Operations layer, and a Content layer. At present, the Secure Transport layer, the Messages layer, and the Operations layer of NETCONF have been defined in a standard, but the Content layer has no standard data modeling language or related data model. This is an important factor constraining actual popularization and application of NETCONF.

In recent years, a Yet Another Next Generation (YANG) data modeling language is used as a standard NETCONF data modeling language by the Internet Engineering Task Force (IETF). The YANG data modeling language can be used to not only establish a model of configuration data, but also establish models of various operations and notifications, and therefore has good readability and scalability. At present, the YANG language can be used to perform data modeling for the Content layer, the Operations layer, and the Messages layer of NETCONF.

NETCONF uses a client/server (C/S) architecture. As shown in FIG. 1, FIG. 1 is a schematic diagram of a relationship between NETCONF and YANG. A NETCONF client and a NETCONF server communicate with each other based on NETCONF. The NETCONF client uses the YANG language to establish a model of configuration data, and uses XML to encode configuration data obtained after modeling to obtain an XML file. A NETCONF message delivered by the NETCONF client to the NETCONF server carries the XML file. After receiving the NETCONF message from the NETCONF client, the NETCONF server performs parsing processing on content of the message to obtain the configuration data.

As shown in FIG. 2, FIG. 2 is a schematic diagram of a device cascading scenario. A network management device 21 is connected to a managed device 22, and the managed device 22 is connected to several lower-level devices 23. The network management device 21 serves as a NETCONF client, and the managed device 22 serves as a NETCONF server. The network management device 21 and the managed device 22 communicate with each other based on NETCONF. The managed device 22 and the lower-level device 23 may communicate with each other based on any configuration management protocol. For example, the managed device 22 and the lower-level device 23 communicate with each other based on Control and Provisioning of Wireless Access Points (CAPWAP). The network management device 21 configures the managed device 22 and the lower-level device 23 using NETCONF. The lower-level device 23 is not directly connected to the network management device 21, but receives, using CAPWAP, configuration data sent by the managed device 22. The managed device 22 receives configuration data sent by the network management device 21, and the configuration data includes configuration data for the managed device 22 and configuration data for the lower-level device 23. For the configuration data sent by the network management device 21 for the lower-level device 23, the managed device 22 terminates a NETCONF message delivered by the network management device 21, performs parsing processing on content of the message to obtain the configuration data, and re-encapsulates the configuration data into a CAPWAP packet and sends the CAPWAP packet to the lower-level device 23.

In the device cascading scenario shown in FIG. 2, the following problem exists when NETCONF is used for configuration and management. In a standard NETCONF message, a relationship between configuration data and a configured device is not reflected. That is, the managed device 22 cannot know a lower-level device 23 or lower-level devices 23 to which configuration data carried in the NETCONF message is delivered. To resolve the foregoing problem, an extension field is added to a NETCONF message, and the extension field is used to transfer additional information. Further, the NETCONF message delivered by the network management device 21 to the managed device 22 includes a content field and an extension field. The content field carries configuration data according to a data model defined using the YANG language. The extension field carries device information, and the device information is used to indicate a target lower-level device of the configuration data in the NETCONF message.

However, foregoing has at least the following technical disadvantages.

1. An extension field needs to be added to a NETCONF message to add private device information. As a result, a network management device and a managed device provided by a third party provider cannot interwork with each other, and solution universality is relatively poor.

2. One NETCONF message can carry only configuration data for a lower-level device or same configuration data for some lower-level devices. Different configuration data needs to be sent multiple times in multiple NETCONF messages. As a result, configuration processing efficiency is relatively low.

3. A managed device needs to generate multiple different databases for different lower-level devices according to extension fields in order to store corresponding configuration data separately. As a result, a data storage processing procedure is relatively complex.

SUMMARY

Embodiments of this application provide a device configuration method and apparatus that are based on NETCONF to resolve problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex. The technical solution is as follows.

According to a first aspect, a device configuration method based on NETCONF is provided, and the method is applied to a network management device. The network management device is connected to a managed device, the managed device is connected to one or more lower-level devices, and the network management device and the managed device support NETCONF. The method includes establishing a model of configuration data using a predefined YANG model, where the predefined YANG model includes n reference fields and one or more object fields separately corresponding to each reference field, the reference field is used to indicate a YANG model referenced in the predefined YANG model, an object field corresponding to an $i^{th}$ reference field is used to indicate a target lower-level device or a target lower-level device group of target configuration data modeled using a YANG model referenced in the $i^{th}$ reference field, the target lower-level device group is a group including one or more lower-level devices, $1 \leq i \leq n$, and i and n are positive integers, and sending the configuration data to the managed device based on NETCONF.

In a first possible implementation of the first aspect, the reference field is defined using a first statement, and the first statement is used to reference, in one YANG model, a schema tree defined by another YANG model.

With reference to the first aspect or the first possible implementation of the first aspect, in a second possible implementation of the first aspect, the object field is defined using a leaf-list feature, and the leaf-list feature is used to describe a group of leaf nodes of a same type.

With reference to the first aspect, the first possible implementation of the first aspect, or the second possible implementation of the first aspect, in a third possible implementation of the first aspect, the one or more object fields corresponding to the $i^{th}$ reference field includes one or more first object fields or one or more second object fields. Each first object field is used to indicate a lower-level device to which the target configuration data modeled using the YANG model referenced in the $i^{th}$ reference field is to be delivered. Each second object field is used to indicate a lower-level device group to which the target configuration data modeled using the YANG model referenced in the $i^{th}$ reference field is to be delivered.

According to a second aspect, a device configuration method based on NETCONF is provided, and the method is applied to a managed device. The managed device is connected to a network management device, the managed device is further connected to one or more lower-level devices, and the network management device and the managed device support NETCONF. The method includes receiving configuration data that is sent by the network management device based on NETCONF, where the configuration data is modeled by the network management device using a predefined YANG model, parsing the configuration data according to the predefined YANG model, and configuring a lower-level device according to the configuration data obtained from parsing.

In a first possible implementation of the second aspect, the configuring a lower-level device according to the configuration data obtained from parsing includes determining a target lower-level device of the target configuration data according to an object field corresponding to the $i^{th}$ reference field for target configuration data modeled using a YANG model referenced in an $i^{th}$ reference field, where the target lower-level device is a lower-level device indicated by an object field corresponding to the $i^{th}$ reference field or a lower-level device in a lower-level device group indicated by an object field corresponding to the $i^{th}$ reference field, and sending the target configuration data to the target lower-level device based on a target configuration management protocol, where the target configuration management protocol is a configuration management protocol supported by the managed device and the target lower-level device.

With reference to the second aspect or the first possible implementation of the second aspect, in a second possible implementation of the second aspect, after parsing the configuration data according to the predefined YANG model, the method further includes storing the configuration data obtained from parsing in a configuration database corresponding to the predefined YANG model.

According to a third aspect, a device configuration apparatus based on NETCONF is provided, the apparatus includes at least one unit, and the at least one unit is configured to implement the device configuration method provided in the first aspect or any possible implementation of the first aspect.

According to a fourth aspect, a device configuration apparatus based on NETCONF is provided, the apparatus includes at least one unit, and the at least one unit is configured to implement the device configuration method provided in the second aspect or any possible implementation of the second aspect.

According to a fifth aspect, a device configuration system based on NETCONF is provided, and the system includes a network management device, a managed device, and one or more lower-level devices. The network management device is connected to the managed device, the managed device is connected to the one or more lower-level devices, and the network management device and the managed device support NETCONF. The network management device includes the device configuration apparatus described in the third aspect. The managed device includes the device configuration apparatus described in the fourth aspect.

According to a sixth aspect, a network management device is provided. The network management device includes a processor, a memory, and a transceiver. The memory is configured to store one or more instructions. The instruction is configured to be executed by the processor. The instruction is used to implement the device configuration method provided in the first aspect or any possible implementation of the first aspect.

According to a seventh aspect, a managed device is provided. The managed device includes a processor, a memory, and a transceiver. The memory is configured to store one or more instructions. The instruction is configured to be executed by the processor. The instruction is used to implement the device configuration method provided in the second aspect or any possible implementation of the second aspect.

The technical solutions provided in the embodiments of this application bring the following beneficial effects The model of the configuration data is established by the network management device using the predefined YANG model, the configuration data is sent to the managed device based on NETCONF, and the managed device parses the configuration data according to the predefined YANG model and configures the lower-level device according to the configuration data obtained from parsing. This resolves problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex.

Without modifying a defined YANG model, the predefined YANG model is used by designing a reference field and an object field in the predefined YANG model to reference configuration data and indicate a target lower-level device or a target lower-level device group of the configuration data. This achieves the following technical effects First, no extension field is added to the NETCONF message, and therefore, NETCONF does not need to be extended such that the network management device and the managed device communicate with each other still based on standard NETCONF, and the solution universality is better.

Second, configuration data modeled using multiple YANG models may be referenced in the predefined YANG model using multiple reference fields, and a target lower-level device or a target lower-level device group of each piece of configuration data may be separately identified. Therefore, one NETCONF message can carry different configuration data delivered for different lower-level devices/lower-level device groups, thereby improving the configuration processing efficiency.

Third, the predefined YANG model is used to perform modeling for all configuration data carried in a NETCONF message delivered by the network management device such that the managed device may maintain only a database corresponding to the predefined YANG model, without separately maintaining multiple different databases for different lower-level devices and lower-level device groups. This simplifies database configuration and management, and simplifies the data storage processing procedure.

BRIEF DESCRIPTION OF DRAWINGS

To describe the technical solutions in some of the embodiments of this application more clearly, the following briefly describes the accompanying drawings required for describing some of the embodiments.

DESCRIPTION OF EMBODIMENTS

To make the objectives, technical solutions, and advantages of this application clearer, the following further describes the implementations of this application in detail with reference to the accompanying drawings.

A "module" mentioned in this specification is a program or an instruction that is stored in a memory and that can implement some functions. A "unit" mentioned in this specification is a functional structure divided according to logic. The "unit" may be implemented by only hardware, or implemented by a combination of software and hardware.

"Several" mentioned in this specification is one or more, and "multiple" is two or more. The term "and/or" describes an association relationship for describing associated objects and represents that three relationships may exist. For example, A and/or B may represent the following three cases, only A exists, both A and B exist, and only B exists. The character "/" generally indicates an "or" relationship between the associated objects.

Figure 1:
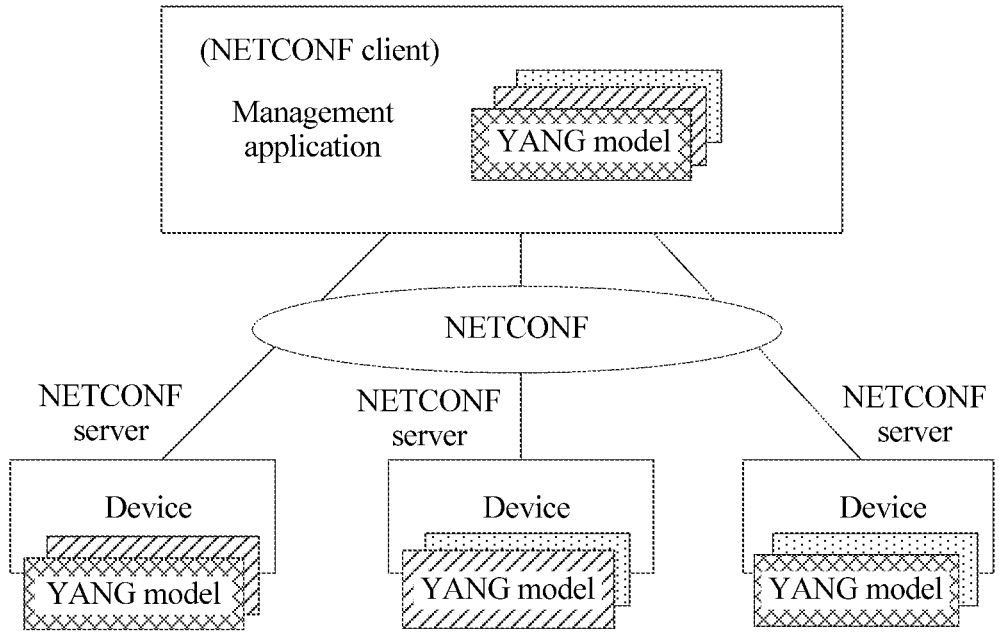
FIG. 1 is a schematic diagram of a relationship between NETCONF and YANG.
Figure 2:
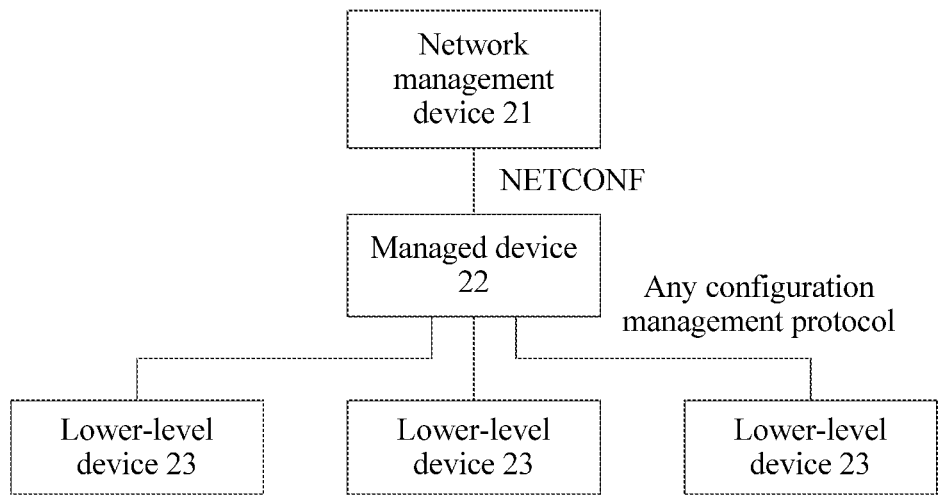
FIG. 2 is a schematic diagram of a device cascading scenario.
Figure 3A:
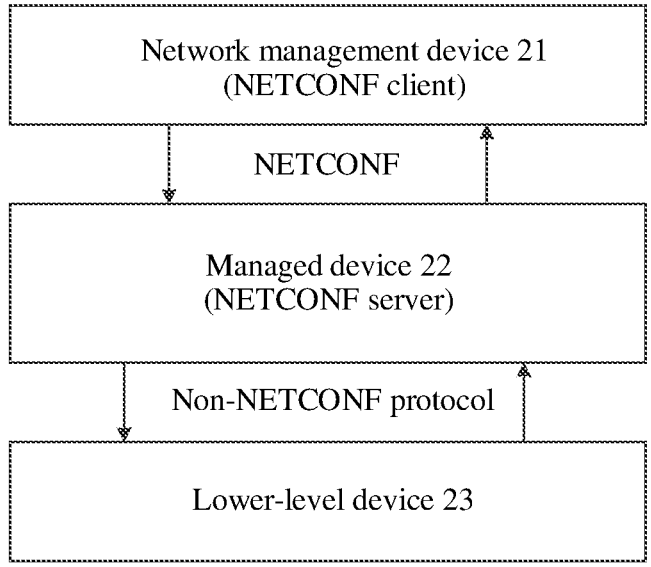
FIG. 3A is a schematic diagram of an application scenario according to an embodiment of this application.

The technical solutions provided in the embodiments of this application is applied to a device cascading scenario shown in FIG. 2. In a possible implementation, as shown in FIG. 3A, a network management device 21 serves as a NETCONF client, and a managed device 22 serves as a NETCONF server. The network management device 21 and the managed device 22 communicate with each other based on NETCONF, and the managed device 22 and a lower-level device 23 communicate with each other based on a non-NETCONF protocol. For example, when the device cascading scenario is applied to a wireless local area network (WLAN), the non-NETCONF protocol may be CAPWAP.

Figure 3B:
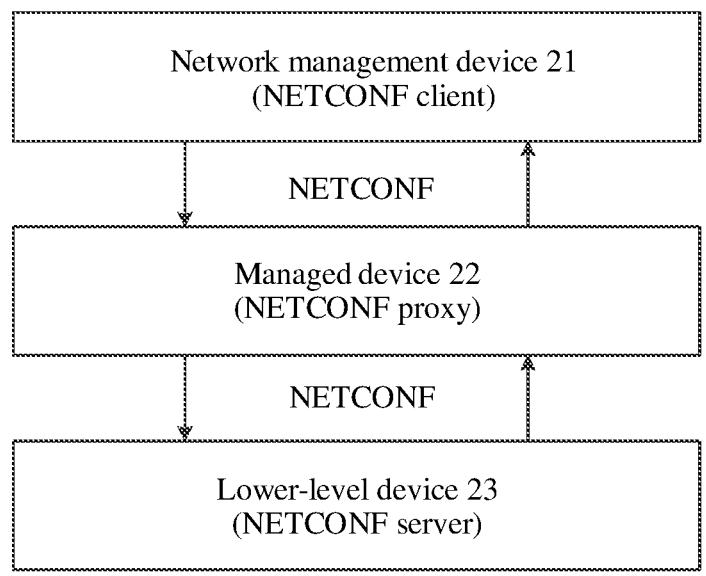
FIG. 3B is a schematic diagram of another application scenario according to an embodiment of this application.

In another possible implementation, as shown in FIG. 3B, a network management device 21 serves as a NETCONF client, a managed device 22 serves as a NETCONF proxy, and a lower-level device 23 serves as a NETCONF server. For the network management device 21, the NETCONF proxy implements a function of a NETCONF server. For the lower-level device 23, the NETCONF proxy implements a function of a NETCONF client. The network management device 21 and the managed device 22 communicate with each other based on NETCONF, and the managed device 22 and the lower-level device 23 communicate with each other also based on NETCONF.

It should be noted that all of the NETCONF client, the NETCONF server, and the NETCONF proxy are software processes running in a device, and are not hardware.

Figure 4:
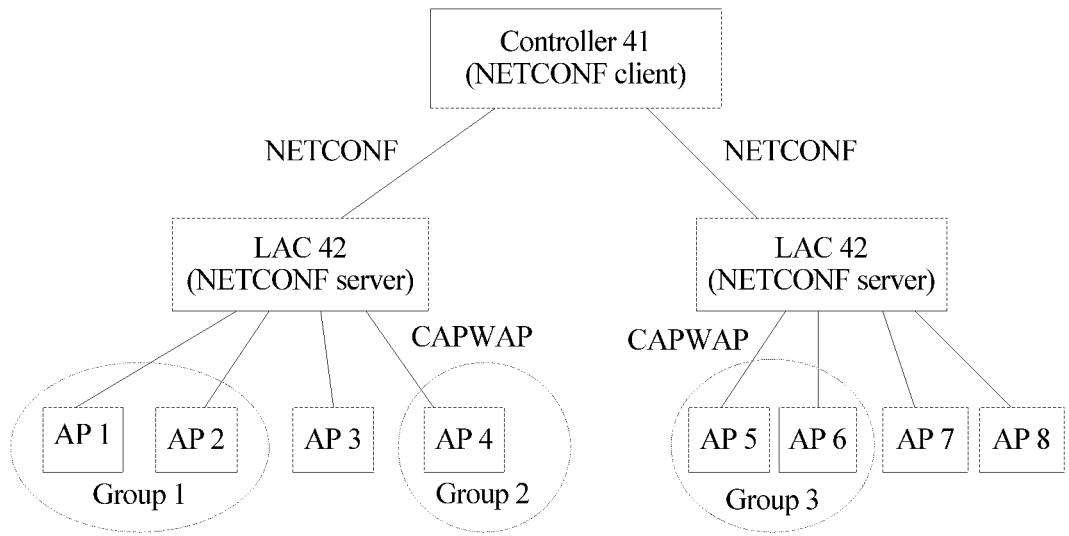
FIG. 4 is a diagram of a network architecture of a device cascading scenario in a wireless local area network.

As shown in FIG. 4, a device cascading scenario in a WLAN is used as an example. A network architecture includes a controller 41, a local access controller (LAC) 42, and several access points (APs) designated as AP 1, AP 2, AP 3, AP 4, AP 5, AP 6, AP 7, and AP 4. The controller 41 and the LAC 42 communicate with each other based on NETCONF. The LAC 42 and the APs communicate with each other based on CAPWAP.

The controller 41 serves as a NETCONF client. The controller 41 is configured to configure the LAC 42 and each AP using NETCONF. The controller 41 may also be referred to as a centralized controller or an agile controller, and is configured to manage all APs subordinated to the controller 41. A quantity of APs that are subordinated to and managed by the controller 41 can reach hundred thousands or even millions.

The LAC 42 serves as a NETCONF server. The LAC 42 is configured to receive configuration data sent by the controller 41, and the configuration data includes configuration data for the LAC 42 and configuration data for the AP managed by the LAC 42. For a NETCONF message delivered by the controller 41, the LAC 42 terminates the NETCONF message, parses content of the message to obtain the configuration data, and re-encapsulates the configuration data into a CAPWAP packet and sends the CAPWAP packet to a corresponding AP. The LAC 42 may also be referred to as a light access controller. The LAC 42 and the AP establish a communication connection using a local area network. For example, the LAC 42 may be connected to the AP using one or more levels of switches. For another example, the LAC 42 may also be connected to the AP using one or more levels of routers.

The AP is not directly connected to the controller 41, but receives, using CAPWAP, configuration data sent by the LAC 42.

In addition, each LAC 42 may be configured to manage several APs and/or several AP groups. Each AP group includes at least one AP. For example, an LAC 42 on a left side in FIG. 4 is configured to manage an AP 3 and two AP groups (a group 1 and a group 2). The group 1 includes an AP 1 and an AP 2, and the group 2 includes an AP 4.

If other approaches manner in which an extension field is added to a NETCONF message is used to configure features of an AP, such as Dynamic Host Configuration Protocol (DHCP) and a domain name system (DNS), a specific procedure is as follows.

1. A controller establishes a model of configuration data using a YANG model.

In an example of configuring a DHCP feature of an AP, it is assumed that a corresponding YANG model is hw-dhcp.yang, and the controller uses a data model defined by hw-dhcp.yang to perform modeling on DHCP configuration data.

2. The controller generates a NETCONF message.

The NETCONF message includes a content field and an extension field. The content field carries configuration data constructed using the YANG model, for example, the DHCP configuration data modeled using hw-dhcp.yang. The extension field carries device information. The device information is used to indicate an AP and/or AP group to which the configuration data in the NETCONF message is to be delivered. For example, when the DHCP configuration data is applicable to all of the AP 3 and the AP 1 and the AP 2 that are in the group 1, the extension field carries identification information corresponding to the AP 3 and the group 1.

For example, the NETCONF message is as follows:

```
<rpc message-id="101"
    xmlns="urn:ietf:params:xml:ns:netconf:base:1.0">
    <device-group> group1 </device-group>
    <device-name> ap3 </device-name>
    <edit-config>
        <!-- method parameters here... -->
    </ edit-config >
</rpc>
```

3. The controller sends the NETCONF message to an LAC.

Correspondingly, the LAC receives the NETCONF message from the controller.

4. The LAC parses the NETCONF message to obtain device information carried in an extension field and configuration data carried in a content field.

5. The LAC stores the configuration data separately in a database corresponding to an AP and/or AP group indicated by the extension field.

For example, the LAC stores the DHCP configuration data in a database DB 1 corresponding to the group 1, and stores the DHCP configuration data in a database DB 2 corresponding to the AP 3.

6. The LAC configures the AP according to the device information and the configuration data.

After detecting that configuration data in the database is changed, a functional module that is configured to configure and manage an AP and that is in the LAC reads the configuration data from the database, and sends the configuration data separately to a corresponding AP and/or AP group.

Therefore, when a manner in which an extension field is added to a NETCONF message is used to configure a lower-level device in a device cascading scenario, there are problems that solution universality is relatively poor, configuration processing efficiency is relatively low, and a data storage processing procedure is relatively complex.

The following describes, using several embodiments, the technical solutions provided in this application.

Figure 5A:
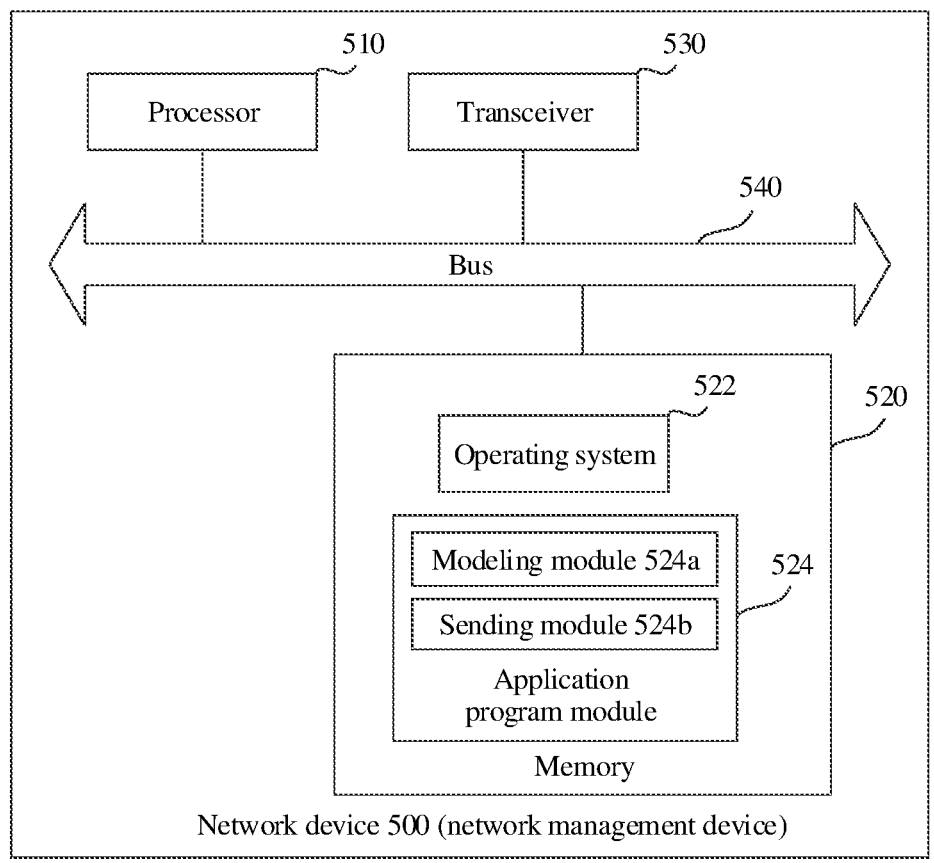
FIG. 5A and FIG. 5B are block diagrams of a network device according to an embodiment of this application.
Figure 5B:
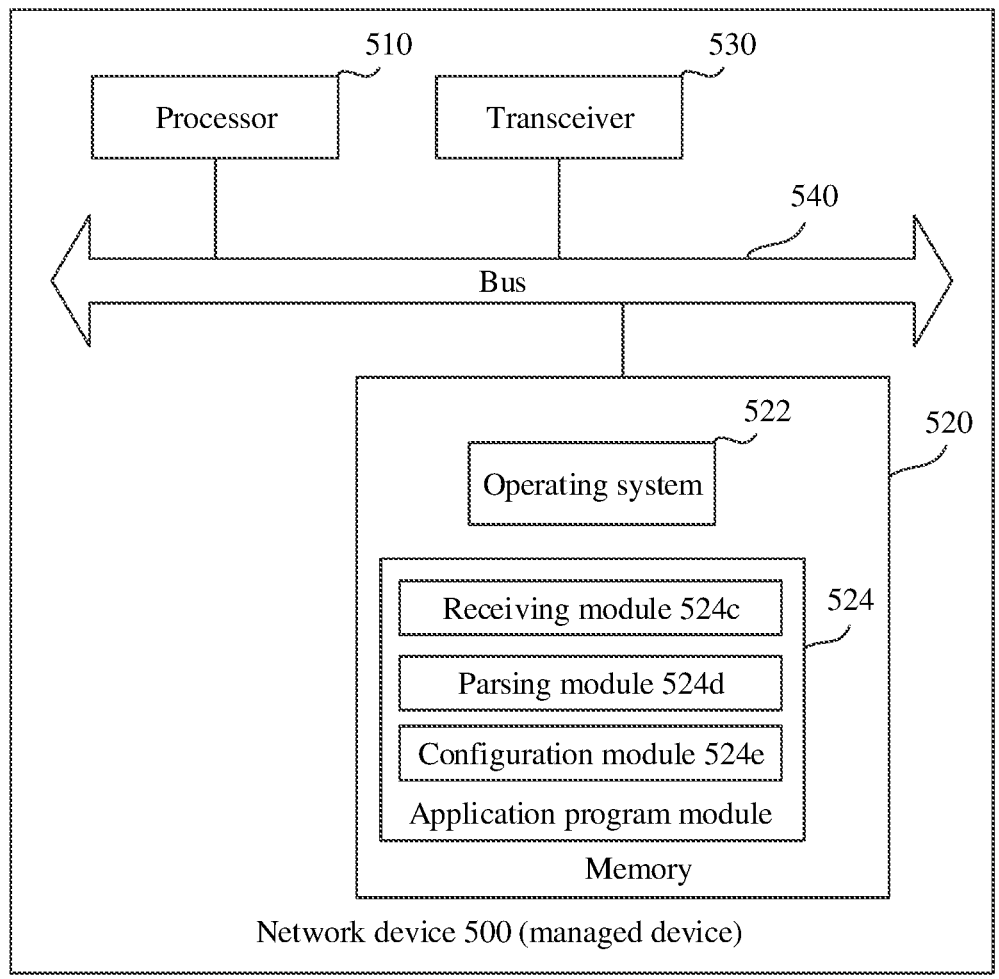

Referring to FIG. 5A and FIG. 5B, FIG. 5A and FIG. 5B are block diagrams of a network device according to an embodiment of this application. The network device 500 may be a network management device (for example, a controller in the network architecture shown in FIG. 4) in the embodiments of this application, or may be a managed device (for example, an LAC in the network architecture shown in FIG. 4) in the embodiments of this application.

The network device 500 may include a processor 510, a memory 520, a transceiver 530, and a bus 540. The memory 520 and the transceiver 530 are connected to the processor 510 using the bus 540.

The processor 510 includes one or more processing cores. The processor 510 performs various function applications and data processing by running a software program and module. The processor 510 includes a BizLet component, a register component, a control component, and the like. The processor 510 may be an independent central processing unit, or may be an embedded processor such as a microprocessor, a micro controller unit (MCU), or a digital signal processor (DSP).

The memory 520 may be implemented by any type of volatile or non-volatile storage device or a combination thereof, such as a static random access memory (RAM) (SRAM), an electrically erasable programmable read-only memory (ROM) (EEPROM), an erasable programmable ROM (EPROM), a programmable ROM (PROM), a ROM, a magnetic memory, a flash memory, a disk, or an optical disc. The memory 520 may be configured to store an executable instruction such as a software program and module.

The processor 510 is configured to execute the instruction stored in the memory 520. When the network device 500 is a network management device, the processor 510 implements the following method by executing the instruction, establishing a model of configuration data using a predefined YANG model, and controlling the transceiver 530 to send, based on NETCONF, the configuration data to a managed device. The predefined YANG model includes n reference fields and several object fields separately corresponding to each reference field. The reference field is used to indicate a YANG model referenced in the predefined YANG model. An object field corresponding to an $i^{th}$ reference field is used to indicate a target lower-level device and/or a target lower-level device group of target configuration data modeled using a YANG model referenced in the $i^{th}$ reference field. The lower-level device group is a group including several lower-level devices. $1 \le i \le n$, and i and n are positive integers. When the network device 500 is a managed device, the processor 510 implements the following method by executing the instruction, controlling the transceiver 530 to receive configuration data that is sent by a network management device based on NETCONF, parsing the configuration data according to a predefined YANG model, and configuring a lower-level device according to the configuration data obtained from parsing.

The transceiver 530 is configured to perform external communication, and the transceiver 530 may include multiple types of interfaces. For example, when the network device 500 is the network management device, the transceiver 530 is configured to send the configuration data to the managed device based on NETCONF. When the network device 500 is the managed device, the transceiver 530 is configured to receive the configuration data that is sent by the network management device based on NETCONF.

Optionally, the memory 520 may store an operating system 522 and an application program module 524 required by at least one function. The operating system 522 may be a real-time operating system or an operating system such as LINUX, UNIX, WINDOWS, or OS X. When the network device 500 is the network management device, as shown in FIG. 5A, the application program module 524 may include a modeling module 524a and a sending module 524b. The modeling module 524a is configured to establish the model of the configuration data using the predefined YANG model. The sending module 524b is configured to send the configuration data to the managed device based on NETCONF. When the network device 500 is the managed device, as shown in FIG. 5B, the application program module 524 may include a receiving module 524c, a parsing module 524d, and a configuration module 524e. The receiving module 524c is configured to receive the configuration data that is sent by the network management device based on NETCONF. The parsing module 524d is configured to parse the configuration data according to the predefined YANG model. The configuration module 524e is configured to configure the lower-level device according to the configuration data obtained from parsing.

Optionally, the network device 500 may further include an input/output component (not shown in the figure). The input/output component includes a display that is configured to display information and an input device that is configured to input information by a user, such as a mouse or a keyboard. Both the display and the input device are connected to the processor 510 using the bus 540.

Figure 6:
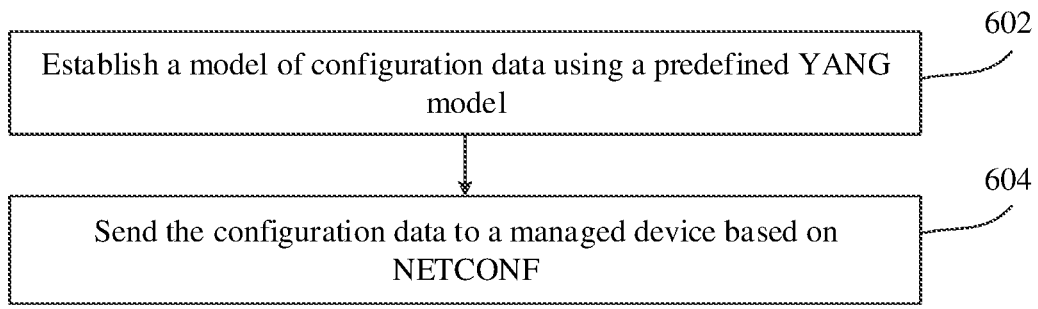
FIG. 6 is a flowchart of a device configuration method based on NETCONF according to an embodiment of this application.

Referring to FIG. 6, FIG. 6 is a flowchart of a device configuration method based on NETCONF according to an embodiment of this application. The method provided in this embodiment is applied to a network management device. The network management device is connected to a managed device, the managed device is connected to several lower-level devices, and the network management device and the managed device support NETCONF. The method includes the following several steps.

Step 602: Establish a model of configuration data using a predefined YANG model.

The predefined YANG model includes n reference fields and several object fields separately corresponding to each reference field. The reference field is used to indicate a YANG model referenced in the predefined YANG model. An object field corresponding to an $i^{th}$ reference field is used to indicate a target lower-level device and/or a target lower-level device group of target configuration data modeled using a YANG model referenced in the $i^{th}$ reference field. The lower-level device group is a group including several lower-level devices. $1 \le i \le n$, and i and n are positive integers.

Step 604: Send the configuration data to the managed device based on NETCONF.

In conclusion, according to the method provided in this embodiment, the model of the configuration data is established by the network management device using the predefined YANG model, and the configuration data is sent to the managed device based on NETCONF. This resolves problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex. Without modifying a defined YANG model, the predefined YANG model is used by designing a reference field and an object field in the predefined YANG model, to reference configuration data and indicate a target lower-level device and/or a target lower-level device group of the configuration data. This achieves the following technical effects.

First, no extension field is added to the NETCONF message, and therefore, NETCONF does not need to be extended such that the network management device and the managed device communicate with each other still based on standard NETCONF, and the solution universality is better.

Second, configuration data modeled using multiple YANG models may be referenced in the predefined YANG model using multiple reference fields, and a target lower-level device and/or a target lower-level device group of each piece of configuration data may be separately identified. Therefore, one NETCONF message can carry different configuration data delivered for different lower-level devices/lower-level device groups, thereby improving the configuration processing efficiency.

Third, the predefined YANG model is used to perform modeling for all configuration data carried in a NETCONF message delivered by the network management device such that the managed device may maintain only a database corresponding to the predefined YANG model, without separately maintaining multiple different databases for different lower-level devices and lower-level device groups. This simplifies database configuration and management, and simplifies the data storage processing procedure.

Figure 7:
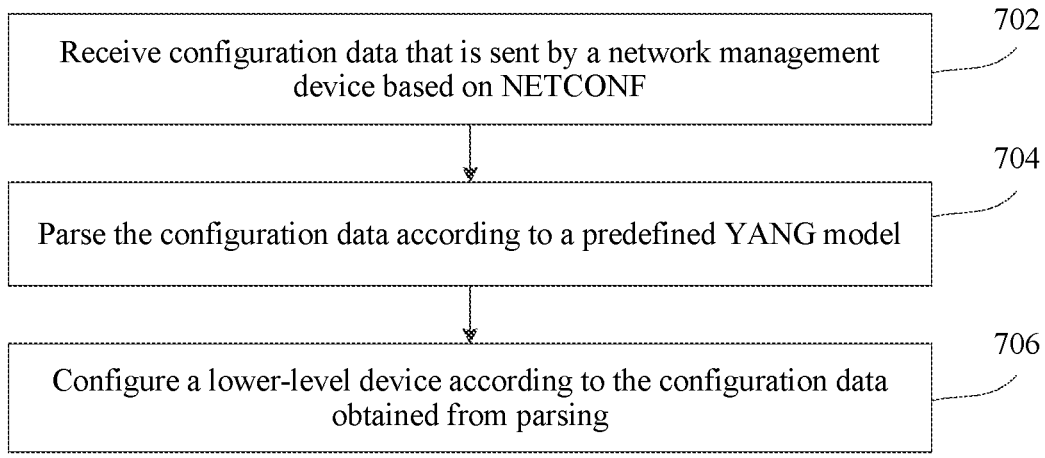
FIG. 7 is a flowchart of a device configuration method based on NETCONF according to another embodiment of this application.

Referring to FIG. 7, FIG. 7 is a flowchart of a device configuration method based on NETCONF according to another embodiment of this application. The method provided in this embodiment is applied to a managed device. The managed device is connected to a network management device, the managed device is further connected to several lower-level devices, and the network management device and the managed device support NETCONF. The method includes the following several steps.

Step 702: Receive configuration data that is sent by the network management device based on NETCONF.

The configuration data is constructed by the network management device using a predefined YANG model. The predefined YANG model includes n reference fields and several object fields separately corresponding to each reference field. The reference field is used to indicate a YANG model referenced in the predefined YANG model. An object field corresponding to an $i^{th}$ reference field is used to indicate a target lower-level device and/or a target lower-level device group of target configuration data modeled using a YANG model referenced in the $i^{th}$ reference field. The lower-level device group is a group including several lower-level devices. $1 \le i \le n$, and i and n are positive integers.

Step 704: Parse the configuration data according to a predefined YANG model.

Step 706: Configure a lower-level device according to the configuration data obtained from parsing.

In conclusion, according to the method provided in this embodiment, the configuration data sent by the network management device based on NETCONF is received by the managed device, the configuration data is constructed by the network management device using the predefined YANG model, and the managed device parses the configuration data according to the predefined YANG model and configures the lower-level device according to the configuration data obtained from parsing. This resolves problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex. Without modifying a defined YANG model, the predefined YANG model is used by designing a reference field and an object field in the predefined YANG model, to reference configuration data and indicate a target lower-level device and/or a target lower-level device group of the configuration data. This improves the solution universality, increases the configuration processing efficiency, and simplifies database configuration and management and the data storage processing procedure.

Figure 8:
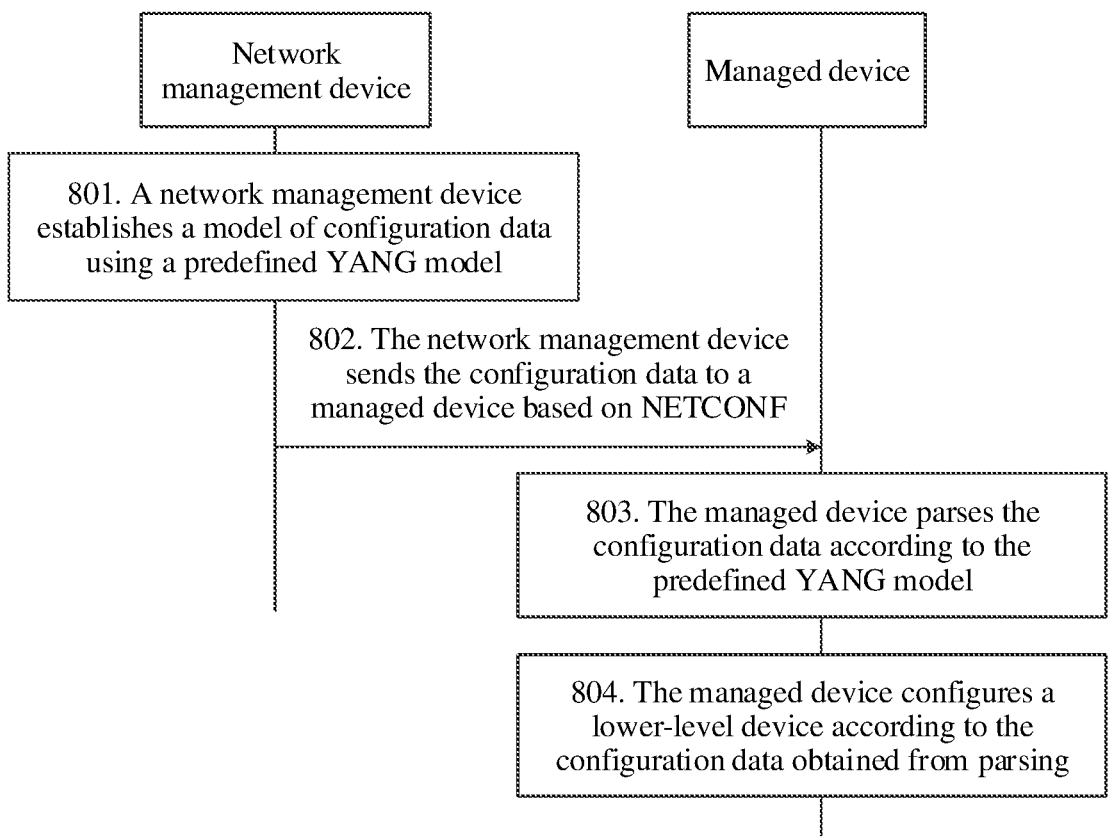
FIG. 8 is a flowchart of a device configuration method based on NETCONF according to another embodiment of this application.

Referring to FIG. 8, FIG. 8 is a flowchart of a device configuration method based on NETCONF according to another embodiment of this application.

Step 801: A network management device establishes a model of configuration data using a predefined YANG model.

The predefined YANG model includes n reference fields and several object fields separately corresponding to each reference field. The reference field is used to indicate a YANG model referenced in the predefined YANG model. An object field corresponding to an $i^{th}$ reference field is used to indicate a target lower-level device and/or a target lower-level device group of target configuration data modeled using a YANG model referenced in the $i^{th}$ reference field. The lower-level device group is a group including several lower-level devices. $1 \leq i \leq n$, and i and n are positive integers. The predefined YANG model is a YANG model pre-defined on peer devices (that is, the network management device and a managed device in this embodiment) that communicate with each other based on NETCONF, that is, a YANG model pre-defined on both a NETCONF client and a NETCONF server.

The reference field is defined using a first statement, and the first statement is used to reference, in one YANG model, a schema tree defined by another YANG model.

In a possible implementation, with a YANG language syntax extended, the first statement is a newly-added refer statement. The reference field is defined using the refer statement. The refer statement is used to reference, in one YANG model, a schema tree defined by another YANG model. A parameter of the refer statement is a name of the referenced YANG model. For example, it is assumed that a YANG model module y references a schema tree defined by another YANG model module x. In this case, a reference field in the module y may be represented as, refer x.

It is assumed that the predefined YANG model is the module y, and the referenced YANG model is the module x. A syntax structure of the module x is as follows

```
module x {
    container a {
        leaf b;
        list c {
            key d;
            leaf d;
            leaf list e;
        }
    }
}
```

A syntax structure of the module y is as follows:

```
module y {
    import x;
    list x-instance {
        key instance-name;
        leaf instance-name;
        refer x;
    }
}
```

The syntax structure of the module y is equivalent to:

```
module y {
    import x;
    list x-instance {
        key instance-name;
        leaf instance-name;
        container a {
            leaf b;
            list c {
                key d;
                leaf d;
                leaf list e;
            }
        }
    }
}
```

Optionally, an object field is defined using a leaf-list feature. The leaf-list feature is used to describe a group of leaf nodes of a same type, and a function of the leaf-list feature is similar to an array in C language. One or more lower-level devices or one or more lower-level device groups may be defined using the leaf-list feature. For example, "leaf-list devices" is used to describe the target lower-level device of the configuration data, and "leaf-list device-groups" is used to describe the target lower-level device group of the configuration data.

In addition, the object field corresponding to the $i^{th}$ reference field includes several first object fields and/or several second object fields. Each first object field is used to indicate a lower-level device to which the target configuration data modeled using the YANG model referenced in the $i^{th}$ reference field is to be delivered. For example, the first object field is represented using "leaf-list devices". Each second object field is used to indicate a lower-level device group to which the target configuration data modeled using the YANG model referenced in the $i^{th}$ reference field is to be delivered. For example, the second object field is represented using "leaf-list device-groups".

With reference to the network architecture shown in FIG. 4, a controller configures features such as DHCP and a DNS of an AP. Configuring the DHCP feature of the AP is used as an example herein, and configuration of another feature may be implemented in a similar manner. Based on different features of the AP, a series of YANG models are already defined, including a YANG model hw-dhcp.yang used to configure the DHCP feature of the AP. In hw-dhcp.yang, a data model corresponding to features such as a name of a DHCP server group used by the AP and an IP address corresponding to a DHCP server is defined. For example, a syntax structure of hw-dhcp.yang is as follows:

```
module hw-dhcp {
namespace "urn:hw:params:xml:ns:yang:hw-dhcp";
prefix hw-dhcp;
......
/*config and state data*/
container dhcp {
        list dhcp-server-group {
           key name;
           leaf name {
                description "the name of the group";
                type string {
                    length "1..31";
                }
           }
           leaf-list ip-address {
                description "ip addresses of dhcp servers in the group";
                max-elements 8;
                type inet:ip-address;
           }
           ......
        }
        ......
} /*end of container dhcp*/
......
} /*end of module hw-dhcp*/
```

It is assumed that the predefined YANG model is master-device.yang, and a syntax structure of master-device.yang is as follows:

```
module master-device {
        ......
        container master {
           list dhcp-config{
               key dhcp-config-id;    //Data of a list type needs
                                      a unique key value.
               leaf dhcp-config-id {
                   type string {
                       length "1..31";
                   }
               }
               refer hw-dhcp;    //hw-dhcp.yang is referenced
to describe DHCP configuration data of a device.
                   leaf-list    devices;    //Describing a target device of
the DHCP configuration data
                   leaf-list    device-groups;    //Describing a target
device group of the DHCP configuration data
               }
               list dns-config{
                   key dns-config-id;    //Data of a list type
                                         needs a unique key value.
                   ......                //Description of the DNS feature
               }
               ......
           } /*end of container master */
        ......
        } /* end of module master-device */
```

Configuration data modeled using multiple YANG models may be referenced in the predefined YANG model using multiple reference fields, and a target lower-level device and/or a target lower-level device group of each piece of configuration data may be separately identified. Therefore, one NETCONF message can carry different configuration data delivered for different lower-level devices/lower-level device groups, thereby improving configuration processing efficiency.

Step 802: The network management device sends the configuration data to a managed device based on NET-CONF.

The network management device uses an XML language to encode the configuration data on which modeling has been completed, and then the network management device sends a NETCONF message to the managed device. The NETCONF message carries encoded configuration data.

Correspondingly, the managed device receives the configuration data that is sent by the network management device based on NETCONF.

Step 803: The managed device parses the configuration data according to the predefined YANG model.

After receiving the NETCONF message from the network management device, the managed device uses the predefined YANG model to parse content of the message in order to obtain the configuration data.

Optionally, the managed device stores the configuration data obtained from parsing in a same configuration database. The predefined YANG model is used to perform modeling for all configuration data carried in the NETCONF message delivered by the network management device such that the managed device may maintain only a database corresponding to the predefined YANG model, without separately maintaining multiple different databases for different lower-level devices and lower-level device groups. This simplifies database configuration and management, and simplifies a data storage processing procedure.

Step 804: The managed device configures a lower-level device according to the configuration data obtained from parsing.

For the target configuration data modeled using the YANG model referenced in the $i^{th}$ reference field, the managed device determines, according to the object field corresponding to the $i^{th}$ reference field, a target lower-level device to which the target configuration data is to be delivered. The target lower-level device is a lower-level device indicated by an object field corresponding to the $i^{th}$ reference field and/or a lower-level device in a lower-level device group indicated by an object field corresponding to the $i^{th}$ reference field. The managed device sends the target configuration data to the target lower-level device based on a target configuration management protocol. The target configuration management protocol is a configuration management protocol supported by the managed device and the target lower-level device.

The configuration management protocol used between the managed device and the lower-level device is not limited in this embodiment of this application. In a possible implementation, with reference to FIG. 3A, the managed device and the target lower-level device communicate with each other based on a non-NETCONF protocol. For example, when the device cascading scenario shown in FIG. 3A is applied to a WLAN, the non-NETCONF protocol may be CAPWAP. For the target configuration data that needs to be delivered to the target lower-level device, the managed device encapsulates the target configuration data into a CAPWAP packet and sends the CAPWAP packet to the target lower-level device. In another possible implementation, with reference to FIG. 3B, the managed device serves as a NETCONF proxy. The managed device and the target lower-level device communicate with each other also based on NETCONF. For the target configuration data that needs to be delivered to the target lower-level device, the managed device encapsulates the target configuration data into a NETCONF message and sends the NETCONF message to the target lower-level device. Certainly, in addition to CAP-WAP and NETCONF, the target configuration management protocol may further be another type of configuration management protocol. For the other type of configuration management protocol, processing performed by the managed device when configuring and managing the target lower-level device is basically similar. Details are not described herein again.

In addition, the managed device may feedback a response message to the network management device after configuring the lower-level device. A procedure of feeding back the response message may be implemented using an existing mechanism specified in NETCONF.

In conclusion, according to the method provided in this embodiment, the model of the configuration data is established by the network management device using the predefined YANG model, the configuration data is sent to the managed device based on NETCONF, and the managed device parses the configuration data according to the predefined YANG model and configures the lower-level device according to the configuration data obtained from parsing. This resolves problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex.

Without modifying a defined YANG model, the predefined YANG model is used by designing a reference field and an object field in the predefined YANG model, to reference configuration data and indicate a target lower-level device and/or a target lower-level device group of the configuration data. This achieves the following technical effects.

First, no extension field is added to the NETCONF message, and therefore, NETCONF does not need to be extended such that the network management device and the managed device communicate with each other still based on standard NETCONF, and the solution universality is better.

Second, configuration data modeled using multiple YANG models may be referenced in the predefined YANG model using multiple reference fields, and a target lower-level device and/or a target lower-level device group of each piece of configuration data may be separately identified. Therefore, one NETCONF message can carry different configuration data delivered for different lower-level devices/lower-level device groups, thereby improving the configuration processing efficiency.

Third, the predefined YANG model is used to perform modeling for all configuration data carried in the NETCONF message delivered by the network management device such that the managed device may maintain only a database corresponding to the predefined YANG model, without separately maintaining multiple different databases for different lower-level devices and lower-level device groups. This simplifies database configuration and management, and simplifies the data storage processing procedure.

In addition, the first statement is added to extend the YANG language syntax in order to conveniently reference, in one YANG model, a schema tree in any defined YANG model. This effectively resolves a YANG model reuse problem in the device cascading scenario, and implements lower-level device configuration in the device cascading scenario using NETCONF and the YANG model.

In addition, one or more lower-level devices or one or more lower-level device groups can be defined using the leaf-list feature, thereby conveniently and flexibly defining the target lower-level device and/or lower-level device group of the configuration data.

It should be additionally noted that there are two YANG model reuse mechanisms in an existing YANG language syntax module-submodule and uses-grouping.

A YANG model reuse mechanism implemented in the module-submodule manner is as follows. First, a submodule is defined, stating that the submodule belongs to a module, and a schema tree corresponding to the submodule is defined, and then a module is defined, where the module includes the previously defined submodule. In this way, the schema tree defined by the submodule is referenced in the module. YANG model reuse implemented in the module-submodule manner has the following disadvantage. Rather than any submodule or module, only a defined submodule that belongs to the module can be referenced in the module. However, in a defined YANG model, an independent module generally is formed according to a function feature configured in the YANG model. Therefore, it is impossible to reference, in one module, a schema tree defined by another module.

In addition, YANG model reuse implemented in the uses-grouping manner has the following disadvantage, uses supports only reuse of a schema tree that is defined using grouping and that is in the current model or in an introduced model. However, no YANG model in defined YANG models defines grouping that includes all fields of the YANG model. Therefore, it is also impossible to resolve the YANG model reuse problem in the device cascading scenario in the uses-grouping manner.

Based on the foregoing analysis, without modifying a defined YANG model, it is impossible to resolve the YANG model reuse problem in the device cascading scenario in either of the module-submodule manner or the uses-grouping manner. According to the technical solution provided in this embodiment of this application, by extending the YANG language syntax, the refer statement is added, to conveniently reference, in one YANG model, a schema tree in any defined YANG model. This effectively resolves the YANG model reuse problem in the device cascading scenario, and implements configuration and management of a lower-level device configuration in the device cascading scenario using NETCONF and the YANG model.

It should be further noted that, in embodiments of this application, that a type of the statement added in the YANG language syntax is named "refer statement" is merely used as an example for description. In an actual application, a type of an added statement may be named another different name, such as a reference statement or a user-defined statement. This embodiment of this application sets no limitation thereto. Whatever the type of the added statement is named, a function of the added statement is the same as a function of the foregoing described "refer statement", that is, the added statement is used to reference, in one YANG module, a schema tree defined by another YANG module.

The following describes a configuration data instance using a specific example.

A configuration data instance corresponding to the YANG model hw-dhcp.yang used to configure the DHCP feature of the AP is as follows:

```
<dhcp xmlns="urn:hw:params:xml:hw-dhcp">
  <dhcp-server-group>
    <name>dhcp-cfg1<name>
    <ip-address>10.163.18.1<ip-address>
    <ip-address>10.163.23.6<ip-address>
```

```
        <dhcp-server-group>
    </dhcp>
```

It is assumed that the predefined YANG model is lac-device.yang. In lac-device.yang, hw-dhcp.yang is referenced using a refer statement to configure the DHCP feature of the AP that is a lower-level device of an LAC. IP addresses 10.163.18.1 and 10.163.23.6 belong to one dhcp-server-group whose name is dhcp-cfg1. When the controller configures the lower-level device of the LAC, configuration data of dhcp-server-group is delivered to a lower-level device AP 3 and lower-level device groups group 1 and group 2 for application. A configuration data instance corresponding to lac-device.yang is as follows:

```
<lac xmlns="urn:hw:params:xml:lac-dhcp">
    <dhcp-config>
        <dhcp-config-id>dhcp-id1<dhcp-config-id>
        <hw-dhcp>
            <hw-dhcp:dhcp>
                <hw-dhcp:dhcp-server-group>
                    <hw-dhcp:name>dhcp-cfg1</hw-dhcp:name>
                    <hw-dhcp:ip-address>10.163.18.1</hw-dhcp:ip-address>
                    <hw-dhcp:ip-address>10.163.23.6</hw-dhcp:ip-address>
                </hw-dhcp:dhcp-server-group>
            </hw-dhcp:dhcp>
        </hw-dhcp>
        <aps>ap3</aps>
        <ap-groups>group1</ap-groups>
        <ap-groups>group2</ap-groups>
    </dhcp-config>
    ......
</lac>
```

The following is an apparatus embodiment of this application, and the apparatus embodiment may be used to execute the method embodiment of this application. For details not disclosed in the apparatus embodiment of this application, refer to the method embodiment of this application.

Figure 9:
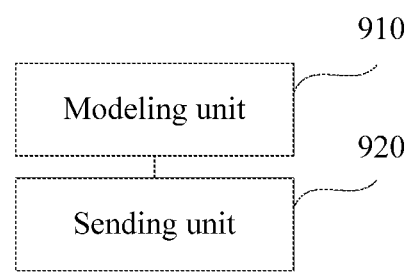
FIG. 9 is a block diagram of a device configuration apparatus based on NETCONF according to an embodiment of this application.

Referring to FIG. 9, FIG. 9 is a block diagram of a device configuration apparatus based on NETCONF according to an embodiment of this application. The apparatus provided in this embodiment may be a part or a whole of a network management device. The network management device is connected to a managed device, the managed device is connected to several lower-level devices, and the network management device and the managed device support NETCONF. The apparatus may include a modeling unit 910 and a sending unit 920.

The modeling unit 910 is configured to establish a model of configuration data using a predefined YANG model.

The predefined YANG model includes n reference fields and several object fields separately corresponding to each reference field. The reference field is used to indicate a YANG model referenced in the predefined YANG model. An object field corresponding to an $i^{th}$ reference field is used to indicate a target lower-level device and/or a target lower-level device group of target configuration data modeled using a YANG model referenced in the $i^{th}$ reference field. The lower-level device group is a group including several lower-level devices. $1 \leq i \leq n$, and i and n are positive integers.

The sending unit 920 is configured to send the configuration data modeled by the modeling unit 910 to the managed device based on NETCONF.

In conclusion, according to the apparatus provided in this embodiment, the model of the configuration data is established by the network management device using the predefined YANG model, and the configuration data is sent to the managed device based on NETCONF. This resolves problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex. Without modifying a defined YANG model, the predefined YANG model is used by designing a reference field and an object field in the predefined YANG model, to reference configuration data and indicate a target lower-level device and/or a target lower-level device group of the configuration data. This improves the solution universality, increases the configuration processing efficiency, and simplifies database configuration and management and the data storage processing procedure.

In an optional embodiment provided based on the embodiment shown in FIG. 9, a reference field is defined using a first statement, and the first statement is used to reference, in one YANG model, a schema tree defined by another YANG model.

In another optional embodiment provided based on the embodiment shown in FIG. 9, an object field is defined using a leaf-list feature, and the leaf-list feature is used to describe a group of leaf nodes of a same type.

In another optional embodiment provided based on the embodiment shown in FIG. 9, the object field corresponding to the $i^{th}$ reference field includes several first object fields and/or several second object fields. Each first object field is used to indicate a lower-level device to which the target configuration data modeled using the YANG model referenced in the $i^{th}$ reference field is to be delivered. Each second object field is used to indicate a lower-level device group to which the target configuration data modeled using the YANG model referenced in the $i^{th}$ reference field is to be delivered.

Figure 10:
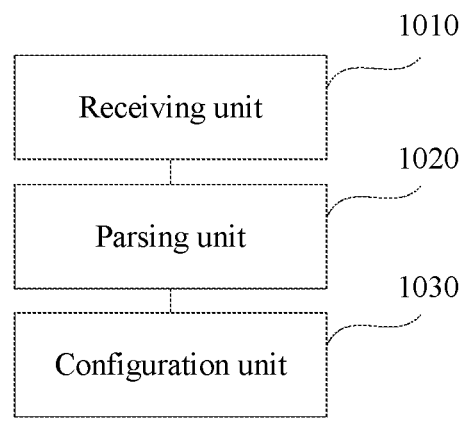
FIG. 10 is a block diagram of a device configuration apparatus based on NETCONF according to another embodiment of this application.

Referring to FIG. 10, FIG. 10 is a block diagram of a device configuration apparatus based on NETCONF according to another embodiment of this application. The apparatus provided in this embodiment may be a part or a whole of a managed device. The managed device is connected to a network management device, the managed device is further connected to several lower-level devices, and the network management device and the managed device support NETCONF. The apparatus may include a receiving unit 1010, a parsing unit 1020, and a configuration unit 1030.

The receiving unit 1010 is configured to receive configuration data that is sent by the network management device based on NETCONF.

The configuration data is constructed by the network management device using a predefined YANG model. The predefined YANG model includes n reference fields and several object fields separately corresponding to each reference field. The reference field is used to indicate a YANG model referenced in the predefined YANG model. An object field corresponding to an $i^{th}$ reference field is used to indicate a target lower-level device and/or a target lower-level device group of target configuration data modeled using a YANG model referenced in the $i^{th}$ reference field. The lower-level device group is a group including several lower-level devices. $1 \leq i \leq n$, and i and n are positive integers.

The parsing unit 1020 is configured to parse the configuration data according to the predefined YANG model.

The configuration unit 1030 is configured to configure a lower-level device according to the configuration data obtained from parsing.

In conclusion, according to the apparatus provided in this embodiment, the configuration data sent by the network management device based on NETCONF is received by the managed device, the configuration data is constructed by the network management device using the predefined YANG model, and the managed device parses the configuration data according to the predefined YANG model and configures the lower-level device according to the configuration data obtained from parsing. This resolves problems that when an extension field is added to a NETCONF message to indicate a target lower-level device of configuration data in the NETCONF message in a device cascading scenario, solution universality is relatively poor, configuration processing efficiency is relatively low, and a data storage processing procedure is relatively complex. Without modifying a defined YANG model, the predefined YANG model is used by designing a reference field and an object field in the predefined YANG model, to reference configuration data and indicate a target lower-level device and/or a target lower-level device group of the configuration data. This improves the solution universality, increases the configuration processing efficiency, and simplifies database configuration and management and the data storage processing procedure.

In an optional embodiment provided based on the embodiment shown in FIG. 10, the configuration unit 1030 is further configured to determine, according to the object field corresponding to the $i^{th}$ reference field, a target lower-level device to which the target configuration data is to be delivered for the target configuration data modeled using the YANG model referenced in the $i^{th}$ reference field, where the target lower-level device is a lower-level device indicated by an object field corresponding to the $i^{th}$ reference field and/or a lower-level device in a lower-level device group indicated by an object field corresponding to the $i^{th}$ reference field, and send the target configuration data to the target lower-level device based on a target configuration management protocol, where the target configuration management protocol is a configuration management protocol supported by the managed device and the target lower-level device.

In another optional embodiment provided based on the embodiment shown in FIG. 10, the apparatus further includes a storage unit configured to store the configuration data obtained from parsing in a same configuration database.

An embodiment of this application further provides a device configuration system that is based on NETCONF. With reference to FIG. 2, the system includes a network management device, a managed device, and several lower-level devices. The network management device is connected to the managed device, and the managed device is connected to the foregoing several lower-level devices. The network management device and the managed device support NETCONF. The network management device includes the device configuration apparatus provided in the embodiment shown in FIG. 9. The managed device includes the device configuration apparatus provided in the embodiment shown in FIG. 10.

It should be noted that, when the apparatuses provided in the foregoing embodiments implement their functions, division of the foregoing function units is merely used as an example for description. In an actual application, the foregoing functions may be allocated to different functional units for implementation as required. That is, an internal structure of the device is divided into different functional units to implement all or part of the functions described above. In addition, the apparatus embodiments and the method embodiments provided in the foregoing embodiments are based on a same concept. For specific implementation processes of the apparatus embodiments, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may be a ROM, a magnetic disk, an optical disc, or the like.

The foregoing descriptions are merely example embodiments of this application, but are not intended to limit this application. Any modification, equivalent replacement, or improvement made without departing from the principle of this application should fall within the protection scope of this application.

What is claimed is:

1. A device configuration method, comprising:
   establishing, by a network management device, a first configuration data using a predefined Yet Another Next Generation (YANG) model, the first configuration data comprising n reference fields and one or more object fields separately corresponding to each reference field, each reference field of the n reference fields referencing a YANG model to be used for modeling a second configuration data for a target lower-level device or a target lower-level device group, an object field corresponding to an $i^{th}$ reference field indicating a target lower-level device or a target lower-level device group to be configured by using the second configuration data modeled using a YANG model referenced in the $i^{th}$ reference field, the target lower-level device group comprising one or more lower-level devices, $1 \leq i \leq n$, the i and the n being positive integers, the network management device being coupled to a managed device, the managed device being coupled to the one or more lower-level devices, and the network management device and the managed device supporting Network Configuration Protocol (NETCONF); and
   sending, by the network management device, the first configuration data to the managed device based on the NETCONF for the managed device to manage the one or more lower-level devices based on the second configuration data.

2. The method of claim 1, wherein the reference field is defined using a first statement, and the first statement referencing, in one YANG model, a schema tree defined by another YANG model.

3. The method of claim 1, wherein an object field is defined using a leaf-list feature, and the leaf-list feature describes a group of leaf nodes of a same type.

4. The method of claim 1, wherein the object field corresponding to the $i^{th}$ reference field comprises one or more first object fields, and each first object field indicates a lower-level device to which the second configuration data modeled using the YANG model referenced in the $i^{th}$ reference field is to be delivered.

5. A device configuration method, comprising:
   receiving, by a managed device, a first configuration data from a network management device based on a Network Configuration Protocol (NETCONF), the managed device being coupled to the network management device and one or more lower-level devices, the network management device and the managed device supporting the NETCONF, the first configuration data being modeled by the network management device using a predefined Yet Another Next Generation (YANG) model, the first configuration data comprising n reference fields and one or more object fields separately corresponding to each reference field, each reference field of the n reference fields referencing a YANG model to be used for modeling a second configuration data for a target lower-level device or a target lower-level device group, an object field corresponding to an $i^{th}$ reference field indicating a target lower-level device or a target lower-level device group to be configured by using the second configuration data modeled using a YANG model referenced in the $i^{th}$ reference field, the target lower-level device group comprising the one or more lower-level devices, $1 \leq i \leq n$, and the i and the n being positive integers;

parsing, by the managed device, the first configuration data according to the predefined YANG model; and configuring, by the managed device, a lower-level device according to the second configuration data obtained from parsing.

6. The method of claim 5, wherein configuring the lower-level device comprises:

determining the target lower-level device to be configured by using the second configuration data according to the object field corresponding to the $i^{th}$ reference field, the target lower-level device being a lower-level device indicated by the object field corresponding to the $i^{th}$ reference field; and sending the second configuration data to the target lower-level device based on a target configuration management protocol, the target configuration management protocol being supported by the managed device and the target lower-level device.

7. The method of claim 5, wherein after parsing the first configuration data, the method further comprises storing data obtained from parsing the first configuration data in a configuration database corresponding to the predefined YANG model.

8. A device configuration apparatus based on a Network Configuration Protocol (NETCONF), applied to a network management device, comprising:

a processor configured to establish a first configuration data using a predefined Yet Another Next Generation (YANG) model, the first configuration data comprising n reference fields and one or more object fields separately corresponding to each reference field, each reference field of the n reference fields referencing a YANG model to be used for modeling a second configuration data for a target lower-level device or a target lower-level device group, an object field corresponding to an $i^{th}$ reference field indicating a target lower-level device or a target lower-level device group to be configured by using the second configuration data modeled using a YANG model referenced in the $i^{th}$ reference field, the target lower-level device group comprising one or more lower-level devices, $1 \leq i \leq n$, the i and the n being positive integers, the network management device being coupled to a managed device, the managed device being coupled to the one or more lower-level devices, and the network management device and the managed device supporting the NETCONF; and a transceiver coupled to the processor and configured to send the first configuration data to the managed device based on the NETCONF for the managed device to manage the one or more lower-level devices based on the second configuration data.

9. The apparatus of claim 8, wherein the reference field is defined using a first statement, the first statement referencing, in one YANG model, a schema tree defined by another YANG model.

10. The apparatus of claim 8, wherein an object field is defined using a leaf-list feature, the leaf-list feature describing a group of leaf nodes of a same type.

11. The apparatus of claim 8, wherein the object field corresponding to the $i^{th}$ reference field comprises one or more first object fields, each first object field indicating a lower-level device to which the second configuration data modeled using the YANG model referenced in the $i^{th}$ reference field is to be delivered.

12. A device configuration apparatus based on a Network Configuration Protocol (NETCONF), applied to a managed device, comprising:

a transceiver configured to receive a first configuration data from a network management device based on the NETCONF, the managed device being coupled to the network management device and one or more lower-level devices, the network management device and the managed device supporting the NETCONF, the first configuration data being modeled by the network management device using a predefined Yet Another Next Generation (YANG) model, the first configuration data comprising n reference fields and one or more object fields separately corresponding to each reference field, each reference field of the n reference fields referencing a YANG model to be used for modeling a second configuration data for a target lower-level device or a target lower-level device group, an object field corresponding to an $i^{th}$ reference field indicating a target lower-level device or a target lower-level device group to be configured by using the second configuration data modeled using a YANG model referenced in the $i^{th}$ reference field, the target lower-level device group comprising the one or more lower-level devices, $1 \leq i \leq n$, and the i and the n being positive integers;

a processor coupled to the transceiver and configured to:
parse the first configuration data according to the predefined YANG model; and
configure a lower-level device according to the second configuration data obtained from parsing.

13. The apparatus of claim 12, wherein the processor is further configured to:

determine the target lower-level device to be configured by using the second configuration data according to the object field corresponding to the $i^{th}$ reference field, the target lower-level device being a lower-level device indicated by the object field corresponding to the $i^{th}$ reference field; and send, using the transceiver, the second configuration data to the target lower-level device based on a target configuration management protocol, the target configuration management protocol being supported by the managed device and the target lower-level device.

14. The apparatus of claim 12, further comprising a storage unit coupled to the processor and the transceiver and configured to store data obtained from parsing the first configuration data in a configuration database corresponding to the predefined YANG model.

15. The method of claim 1, wherein the object field corresponding to the $i^{th}$ reference field comprises one or more second object fields, each second object field indicating a lower-level device group to which the second configuration data modeled using the YANG model referenced in the i$^{th}$ reference field is to be delivered.

16. The method of claim 5, wherein configuring the lower-level device comprises:

determining the target lower-level device to be configured by using the second configuration data according to the object field corresponding to the i$^{th}$ reference field, the target lower-level device being a lower-level device in a lower-level device group indicated by the object field corresponding to the i$^{th}$ reference field; and sending the second configuration data to the target lower-level device based on a target configuration management protocol, the target configuration management protocol being supported by the managed device and the target lower-level device.

17. The apparatus of claim 8, wherein the object field corresponding to the i$^{th}$ reference field comprises one or more second object fields, each second object field indicating a lower-level device group to which the second configuration data modeled using the YANG model referenced in the i$^{th}$ reference field is to be delivered.

18. The apparatus of claim 12, wherein the processor is further configured to:

determine the target lower-level device to be configured by using the second configuration data according to the object field corresponding to the i$^{th}$ reference field, the target lower-level device being a lower-level device in a lower-level device group indicated by the object field corresponding to the i$^{th}$ reference field; and send, using the transceiver, the second configuration data to the target lower-level device based on a target configuration management protocol, the target configuration management protocol being supported by the managed device and the target lower-level device.

\* \* \* \* \*